United States Patent Office 3,279,923
Patented Oct. 18, 1966

3,279,923
GROWTH-PROMOTING AND YIELD-INCREASING FEEDSTUFFS WHICH CONTAIN THE ANTIBIOTIC MOENOMYCIN
Fritz Bauer, Bad Soden, Taunus, Gerhard Huber, Frankfurt am Main, and Karl Heinz Wallhäusser, Hofheim, Taunus, Germany, assignors to Farbwerke Hoechst Aktiengesellschaft vormals Meister Lucius & Bruning, Frankfurt am Main, Germany, a corporation of Germany.
No Drawing. Filed Mar. 18, 1963, Ser. No. 266,070
Claims priority, application Germany, Mar. 22, 1962, F 36,347
2 Claims. (Cl. 99—2)

The present invention relates to improved antibiotic-containing feedstuffs.

The growth-promoting and yield-increasing antibiotic-containing feedstuffs of the present invention are characterized by a content of Moenomycin. In particular, the feedstuffs of the present invention contain 0.1 to 50 mg. of Moenomycin per kg. of feedstuff, preferably 0.5 to 10 mg. of Moenomycin per kg. of feedstuff.

Comparative feeding tests showed an addition of Moenomycin have a far better effect than the addition of any of the antibiotics conventionally used for such purposes, for example, penicillin, chlorotetracycline, and bacitracin.

Moenomycin, an antibiotic which can be obtained by the process of German Patent 1,113,791, is formed mainly in the mycelium of a streptomyces; as addition to feedstuffs it may be used in the form of the killed and dried mycelium or in the form of the product isolated from the mycelium which is then, if required after purification, incorporated with the feedstuff.

Now, we have found that these Moenomycin-containing feedstuffs considerably promote the growth and markedly improve the feed efficiency of the animals fed with them. Moenomycin may be added, for example, in the amounts specified above, to the conventional feed mixtures, for example, the feeds that conform to the specifications of the German Agricultural Society (DLG).

In serial tests of 2 to 6 weeks duration with chicks, the addition of Moenomycin to the feed in quantities ranging from 0.5 to 20 g. per ton of feed resulted in improved weight gains that ranged from 4.7 to 37.0% and increased feed efficiency (kg. of feed per kg. of weight gain) in the range from 2.9 to 9.4%. The tables of the examples show that the effect produced with Moenomycin was in all cases distinctly superior to the effect produced with penicillin, bacitracin, and chlorotetracycline tested in the same test series. Of particular importance was the surprising finding that the additions of even small amounts of Moenomycin to the feed already produced extraordinarily high weight gains. For example, the effect of the Moenomycin addition to the feed was distinctly superior to that of an chloroetracycline addition, even if the quantity of the latter in the feed was 20 times the quantity of Moenomycin.

Moenomycin is advantageously distinguished from the afore-mentioned antibiotics in that it distinctly improves the conversion of the fodder given to the animals, even if optimum feed mixtures are used.

The feedstuffs according to the present invention, i.e. the Moenomycin-containing feedstuffs, are particularly suitable for the feeding of poultry, advantageously for broilers, turkeys, pigs and calves as well as for cattle, cows, and fattening bulls.

The following examples illustrate the invention, but they are not intended to limit it thereto:

EXAMPLE 1

The tests for the growth-promoting effect of Moenomycin-containing feedstuffs were carried out on male Nichol-chicks kept in electrically heated brooders with meshwire bottoms. The tests were started with day-old chicks and extended over a period of 4 to 6 weeks. During this period of time, the chicks were weighed at regular intervals and their feed consumption was determined.

The feed mixture given to the chicks had the following composition:

| | Percent |
|---|---|
| Soybean meal | 30.0 |
| Cassava meal | 25.0 |
| Corn meal | 20.0 |
| Peanut meal | 11.0 |
| Molasses | 5.0 |
| Fat | 2.5 |
| Cod-fish meal | 1.0 |
| Fish meal | 1.0 |
| Fish-solubles | 0.5 |
| Dried whey | 0.5 |
| Alfalfa meal | 0.5 |
| Calcium carbonate | 1.0 |
| Mineral salts | 2.0 |
| | 100.0 |

Vitamin content per kg.

| | | |
|---|---|---|
| Vitamin A | I.U. | 8000 |
| Vitamin $D_3$ | I.U. | 1000 |
| Vitamin E | I.U. | 4 |
| Vitamin $B_2$ | mg. | 3.2 |
| Vitamin $B_{12}$ | | 12γ |
| Pantothenic acid | mg. | 6.0 |
| Nicotinic acid | mg. | 8.0 |
| Cholin | mg. | 20.0 |
| Methionine | mg. | 100.0 |

TABLE TO EXAMPLE 1

A Moenomycin was used which had been isolated from the mycelium. 200 chicks each were treated with any one of the antibiotics (in 5 groups each of 40 animals). The results are given hereunder.

| Additive | Quantity of antibiotic in mg. per kg. of feed | After 2 weeks | | | | After 4 weeks | | | |
|---|---|---|---|---|---|---|---|---|---|
| | | Average weight gain in grams | Improved weight gain in percent | Average feed efficiency | Improvement of feed efficiency in percent | Average weight gain in grams | Improved weight gain in percent | Average feed efficiency | Improvement of feed efficiency in percent |
| None (Control) | | 141 | | 1.92 | | 477 | | 2.19 | |
| Chlorotetracycline | 10 | 150 | +6.4 | 1.88 | +2.1 | 488 | +2.3 | 2.18 | +0.5 |
| Moenomycin | 10 | 153 | +8.5 | 1.84 | +4.3 | 503 | +5.5 | 2.13 | +2.8 |
| Do | 20 | 153 | +8.5 | 1.84 | +4.3 | 505 | +5.9 | 2.11 | +3.8 |

EXAMPLE 2

A basic feed mixture having the following composition was used:

| | Percent |
|---|---|
| Fish meal | 5 |
| Fish-solubles | 2 |
| Soybean meal | 16 |
| Dried yeast | 2 |
| Alfalfa meal | 3 |
| Barley | 10 |
| Oats | 8 |
| Corn | 33 |
| Wheat | 8 |
| Wheat middlings | 6 |
| Wheat bran | 3 |
| Calcium phosphate | 2 |
| Calcium carbonate | 1 |
| Cattle salt | 0.3 |
| Mixture of trace elements | 0.5 |
| Mixture of vitamins | 0.2 |
| | 100.0 |

The above mixture of vitamins consisted of:

| | |
|---|---|
| Vitamin A | I.U. 5000 |
| Vitamin $D_3$ | I.U. 500 |
| Vitamin $B_2$ | mg. 2 |
| Vitamin $B_{12}$ | $\gamma$ 10 |

TABLE TO EXAMPLE 2

As in Example 1, 80 Nichol-chicks each were treated with each antibiotic; the test period extended over a period of 6 weeks and in addition to chlorotetracycline, penicillin was also used with 80 control chicks. Whereas isolated Moenomycin was used in Example 1, the mycelium was used in the present case. The results are given hereunder:

| Additive | Quantity of antibiotic in mg. per kg. of feed | After 2 weeks | | | | After 4 weeks | | | | After 6 weeks | | | |
|---|---|---|---|---|---|---|---|---|---|---|---|---|---|
| | | Average weight gain in g. | Improved weight gain in percent | Average feed efficiency | Improvement of feed efficiency in percent | Average weight gain in g. | Improved weight gain in percent | Average feed efficiency | Improvement of feed efficiency in percent | Average weight gain in g. | Improved weight gain in percent | Average feed efficiency | Improvement of feed efficiency in percent |
| None (Control) | | 130.5 | | 1.87 | | 426.3 | | 2.34 | | 898.4 | | 2.57 | |
| Chlorotetracycline | 10 | 140.5 | +7.7 | 1.94 | −3.7 | 440.2 | +3.3 | 2.32 | +0.9 | 926.9 | +3.2 | 2.55 | +0.8 |
| Penicillin | 10 | 137.3 | +5.2 | 1.92 | −2.7 | 448.7 | +5.3 | 2.30 | +1.7 | 932.2 | +3.8 | 2.50 | +2.8 |
| Moenomycin (as mycelium) | 10 | 145.9 | +11.8 | 1.80 | +3.9 | 453.9 | +6.5 | 2.27 | +3.1 | 940.7 | +4.7 | 2.48 | +3.6 |

EXAMPLE 3

The effect of an addition of Moenomycin isolated from mycelium was compared with that of chlorotetracycline and penicillin additions. The basic feed was the same as in Example 2. 80 Nichol-chicks were used for each test. The tests extended over a period of 6 weeks and the following results were obtained:

TABLE TO EXAMPLE 3

| Additive | Quantity of antibiotic in mg. per kg. of feed | After 2 weeks | | | | After 4 weeks | | | | After 6 weeks | | | |
|---|---|---|---|---|---|---|---|---|---|---|---|---|---|
| | | Average weight gain in g. | Improved weight gain in percent | Average feed efficiency | Improvement of feed efficiency in percent | Average weight gain in g. | Improved weight gain in percent | Average feed efficiency | Improvement of feed efficiency in percent | Average weight gain in g. | Improved weight gain in percent | Average feed efficiency | Improvement of feed efficiency in percent |
| None (Control) | | 139.5 | | 1.85 | | 515.3 | | 2.14 | | 963.9 | | 2.47 | |
| Chlorotetracycline | 10 | 139.5 | 0 | 1.81 | +2.2 | 509.8 | −1.1 | 2.11 | +1.4 | 967.0 | +0.3 | 2.40 | +2.9 |
| Penicillin | 10 | 137.5 | −1.5 | 1.77 | +4.5 | 508.0 | −1.4 | 2.09 | +2.4 | 987.9 | +2.5 | 2.39 | +3.3 |
| Moenomycin | 10 | 155.3 | +11.3 | 1.77 | +4.5 | 551.6 | +7.0 | 2.08 | +2.9 | 1,010.1 | +4.8 | 2.36 | +4.7 |

EXAMPLE 4

The effect of the addition of 5 mg. and 10 mg. respectively, of Moenomycin per kg. of feed was compared with that of an addition of 10 mg. of chlorotetracycline per kg. of feed, while using a basic feedstuff that had a less favourable composition, viz. a content of 20.3% of crude protein and thus a productive energy of 1890 cal./kg.

96 male Nichol-chicks each, divided in 8 groups each of 12 animals kept in brooders were treated. The test extended over a period of 4 weeks and brought the results specified hereunder:

TABLE TO EXAMPLE 4

| Additive | Quantity of antibiotic in mg. per kg. of feed | After 2 weeks | | | | After 4 weeks | | | |
|---|---|---|---|---|---|---|---|---|---|
| | | Average weight gain in grams | Improved weight gain in percent | Average feed efficiency | Improvement of feed efficiency in percent | Average weight gain in grams | Improved weight gain in percent | Average feed efficiency | Improvement of feed efficiency in percent |
| None (Control) | | 113.6 | | 1.85 | | 385.4 | | 2.32 | |
| Chlorotetracycline | 10 | 126.7 | +11.5 | 1.79 | +3.3 | 416.7 | +8.1 | 2.20 | +5.4 |
| Moenomycin | 5 | 128.8 | +13.4 | 1.71 | +8.2 | 430.0 | +11.6 | 2.12 | +9.4 |
| Do | 10 | 132.6 | +16.7 | 1.76 | +5.1 | 442.4 | +14.8 | 2.21 | +5.0 |

EXAMPLE 5

In a fifth test series, the effects produced with 2.5 mg. of Moenomycin per kg. of feed were compared with that produced by 5 mg. of zinc bactitracin per kg. of feed. In this test, a feed having the composition given hereunder was used.

40 male Nichol-chicks each, divided in 5 subgroups each of 8 animals kept in brooders, were treated.

| | Percent |
|---|---|
| Fish meal | 3 |
| Meat and bone meal | 1 |
| Fish-solubles | 1 |
| Molasses | 5 |
| Soybean meal | 22 |
| Alfalfa meal | 3 |
| Barley | 11 |
| Oats | 5 |
| Corn | 25 |
| Cassava meal | 1 |
| Calcium phosphate | 1 |
| Calcium carbonate | 1.5 |
| Iodized cattle salt | 0.15 |
| Mixture of trace elements S/59 | 0.5 |
| Mixture of vitamins | 0.75 |
| Methionine | 0.1 |
| | 100.0 |

*Vitamin content per kg. of feed*

| | | |
|---|---|---|
| Vitamin A | I.U. | 3000 |
| Vitamin D$_3$ | I.U. | 300 |
| Vitamin B$_2$ | mg. | 2 |
| Vitamin B$_{12}$ | | 8γ |

The test results are given in the following table:

EXAMPLE 6

The effect of 0.5 mg. Moenomycin per kg. of feed was tested with two different basic feeds of similar composition but different content of crude protein. Mixture I contained 16% of crude protein, mixture II 20% of crude protein. The ratio of animal protein to vegetable protein was in both mixtures 1:3.

Chlorotetracycline was used in the twentyfold quantity (10 mg. per kg. of feed) of the Moenomycin used.

Both feeds had the following compositions:

| | I | II |
|---|---|---|
| | Percent | Percent |
| Fish meal | 5 | 6 |
| Meat and bone meal | | 1 |
| Fish-solubles | 3 | 3 |
| Soya meal | 14 | 20 |
| Dried yeast | 3 | 3 |
| Alfalfa meal | 3 | 3 |
| Barley | 10 | 10 |
| Oats | 10 | |
| Corn | 21 | 29 |
| Cassava meal | 26 | 20 |
| Calcium phosphate | 2 | 2 |
| Calcium carbonate | 1 | 1 |
| Iodized cattle salt | 0.5 | 0.5 |
| Mixture of trace elements S/59 | 0.5 | 0.5 |
| Premixture (Maize meal) | 1 | 1 |
| | 100.0 | 100.0 |

*Vitamin content per kg. of feed*

| | | |
|---|---|---|
| Vitamin A | I.U. | 4000 |
| Vitamin D$_3$ | I.U. | 1000 |
| Vitamin E | I.U. | 15 |
| Vitamin B$_2$ | mg. | 4 |
| Vitamin B$_{12}$ | | 2γ |

TABLE TO EXAMPLE 5

| Additive | Quantity of antibiotic in mg. per kg. of feed | After 2 weeks | | After 4 weeks | | After 6 weeks) | | | |
|---|---|---|---|---|---|---|---|---|---|
| | | Average weight gain in grams | Improved weight gain in percent | Average weight gain in grams | Improved weight gain in percent | Average weight gain in grams | Improved weight gain in percent | Average feed efficiency | Improvement of feed efficiency in percent |
| None (Control) | | 158.3 | | 364.5 | | 824.7 | | 2.75 | |
| Zinc-bacitracin | 5 | 161.2 | +1.8 | 394.2 | +8.1 | 853.5 | +3.5 | 2.65 | +3.7 |
| Moenomycin | 2.5 | 177.3 | +12.1 | 499.5 | +37.0 | 992.5 | +20.3 | 2.58 | +6.2 |

TABLE TO EXAMPLE 6

The results of the tests carried out with 30 male Nichol-chicks each with each of both basic feeds are given hereunder:

| Additive | Quantity of antibiotic in mg. per kg. of feed | After 2 weeks | | | | After 4 weeks | | | | After 6 weeks | | | |
|---|---|---|---|---|---|---|---|---|---|---|---|---|---|
| | | Average weight gain in g. | Improved weight gain in percent | Average feed efficiency | Improvement of feed efficiency in percent | Average weight gain in g. | Improved weight gain in percent | Average feed efficiency | Improvement of feed efficiency in percent | Average weight gain in g. | Improved weight gain in percent | Average feed efficiency | Improvement of feed efficiency in percent |
| FEED I | | | | | | | | | | | | | |
| None (Control) | | 137 | | 2.28 | | 357 | | 2.57 | | 777 | | 2.73 | |
| Chlorotetracycline | 10 | 134 | −2.2 | 2.20 | +3.5 | 358 | ±0 | 2.49 | +3.1 | 766 | −1.4 | 2.72 | +0.4 |
| Moenomycin | 0.5 | 147 | +7.3 | 2.06 | +9.6 | 399 | +11.8 | 2.35 | +8.6 | 826 | +6.3 | 2.59 | +5.1 |
| FEED II | | | | | | | | | | | | | |
| None (Control) | | 149 | | 1.90 | | 394 | | 2.27 | | 854 | | 2.48 | |
| Chlorotetracycline | 10 | 155 | +4.0 | 1.92 | −1.0 | 416 | +5.6 | 2.23 | +1.8 | 879 | +2.9 | 2.47 | +0.4 |
| Moenomycin | 0.5 | 165 | +10.7 | 1.82 | +4.2 | 443 | +12.4 | 2.11 | +7.0 | 906 | +6.1 | 2.39 | +3.6 |

EXAMPLE 7

The growth-promoting effect of Moenomycin, incorporated with the hereunder described feed mixture, was tested for on pigs and compared with that of chlorotetracycline. Each group had 7 animals. The individual weights and average weight gains were determined at the beginning of the test, after 4 weeks of treatment, and at the end of the test (after 12 weeks) and compared with those of the animals of the control group.

*Vitamin content per kg. of feed*

| | | |
|---|---|---|
| Vitamin A | I.U. | 2000 |
| Vitamin $D_3$ | I.U. | 250 |
| Vitamin $B_1$ | mg. | 1.5 |
| Vitamin $B_2$ | mg. | 3.0 |
| Vitamin $B_{12}$ | | 15γ |
| Pantothenic acid | mg. | 10.0 |

The test results are given in the following table; they evidence that the weight gains achieved by the use of Moenomycin addition were much better than those achieved with chlorotetracycline, though the latter was used in a quadrifold amount.

TABLE TO EXAMPLE 7

| Additive | Quantity of antibiotic in mg. per kg. of feed | Average weight at beginning of tests in kg. | After 4 weeks | | After 12 weeks | |
|---|---|---|---|---|---|---|
| | | | Average weight gain in kg. | Improved weight gain in percent | Average weight gain in kg. | Improved weight gain in percent |
| None (Control) | | 23.4 | 14.0 | | 52.5 | |
| Chlorotetracycline | 10 | 23.3 | 16.57 | +18.3 | 53.7 | +2.3 |
| Moenomycin | 2.5 | 23.5 | 17.07 | +21.9 | 57.3 | +9.1 |

| | Percent |
|---|---|
| Fish meal | 3 |
| Meat meal | 2 |
| Fish-solubles | 1 |
| Sugar beet cuttings | 10 |
| Potato flocks | 10 |
| Soya meal | 17 |
| Alfalfa meal | 3 |
| Barley | 5.5 |
| Corn | 30 |
| Cassava meal | 15 |
| Calcium phosphate | 0.5 |
| Calcium carbonate | 0.5 |
| Cattle salt | 0.4 |
| Mixture of minerals 2a | 1 |
| Premixture of vitamins with corn meal | 1 |
| Methionine | 0.1 |
| | 100.0 |

We claim:
1. A growth-promoting and yield-increasing feedstuff containing 0.1 to 50 mg. of Moenomycin per kg. of feed.
2. A growth-promoting and yield-increasing feedstuff containing 0.5 to 10 mg. of Moenomycin per kg. of feed.

No references cited.

A. LOUIS MONACELL, *Primary Examiner.*

D. J. DONOVAN, *Assistant Examiner.*